Figure 1:
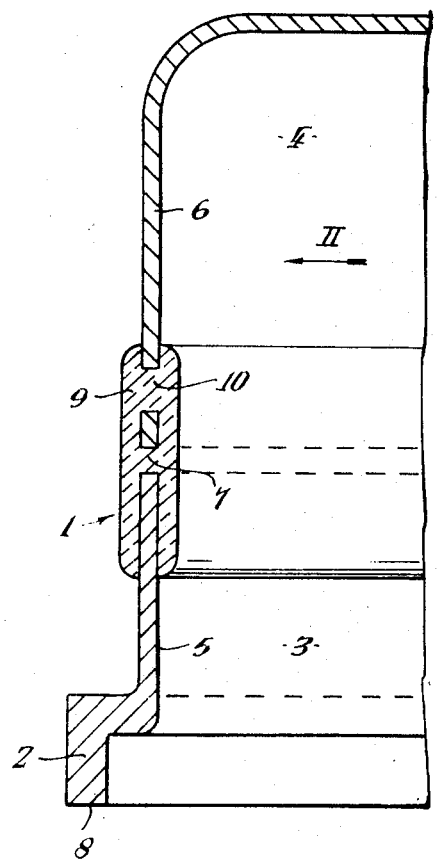

United States Patent
Vickers et al.

[15] 3,692,335
[45] Sept. 19, 1972

[54] COVERS AND DUCTS FOR MACHINERY

[72] Inventors: John Vickers, 64 Cleveland Ave.; John K. Vickers, 3 Mowden Walk, both of Darlington, England

[22] Filed: May 3, 1968

[21] Appl. No.: 726,421

[30] Foreign Application Priority Data

May 4, 1967 Great Britain..........20,826/67

[52] U.S. Cl. .................285/49, 285/235, 285/238, 220/80, 52/403
[51] Int. Cl..............................F16l 55/02
[58] Field of Search........285/49, 174, 235, 417, 371, 285/369, 398, 238, 47, 53, 59, 391, 392, 330, 331, DIG. 9; 52/393, 395, 400, 403; 220/5, 67, 75, 80

[56] References Cited

UNITED STATES PATENTS

| | | | |
|---|---|---|---|
| 2,776,151 | 1/1957 | Harkenrider | 285/238 X |
| 3,114,568 | 12/1963 | Buono | 285/235 |
| 2,364,234 | 12/1944 | Morell | 220/67 X |
| 2,835,360 | 5/1958 | Bernardoni et al. | 52/403 |
| 3,357,594 | 12/1967 | Grosh et al. | 220/80 |

FOREIGN PATENTS OR APPLICATIONS 536,846  5/1941  Great Britain..............285/53

Primary Examiner—David J. Williamowsky
Assistant Examiner—Wayne L. Shedd
Attorney—Jones and Lockwood

[57] ABSTRACT

The specification describes adapted to provide machinery covers and parts thereof including engine covers for internal combustion engines in vehicles and aeroplanes. The members are constructed in two parts with a resilient material interposed to minimize vibration and vibratory noise caused by operation of the machinery.

4 Claims, 2 Drawing Figures

PATENTED SEP 19 1972　　　　　　　　　　　　　　3,692,335

COVERS AND DUCTS FOR MACHINERY

This invention relates to members adapted to provide machinery covers and parts thereof.

It is an object of this invention to provide such members which have a vibration damping effect and thus minimize vibration where it is unwanted, and also reduce noises such as drumming and resonancy caused by vibration.

According to this invention we provide a member adapted to form a machinery cover or part thereof divided at a zone spaced from means for attachment of the member to the machinery, the divided components being separated by a narrow gap and connected together by a band of a resilient natural or synthetic plastics material which fills the said gap and overlaps and is bonded to the marginal surfaces of the components on either side of the gap. In one form of the invention the plastics material overlaps and is bonded to the marginal surfaces both inside and outside the components.

At least one of the components is provided with at least one keying aperture extending therethrough and the resilient material extends to fill the said keying apertures.

The member may be in the form of an engine cover having a flange or rim for attachment to the engine. Such an engine cover may be a valve cover, rocker box cover, crank case access cover or sump. Such members may be used in internal combustion engines, particularly diesel engines, air-compressors and the like and may be used in two and four-wheeled vehicles and airplanes.

With the aid of suitable plastics material and a suitable bonding technique, the invention is applicable to such members of various ferrous and non-ferrous metals, such as mild steel, stainless steel and ferrous alloys, aluminum, magnesium, zinc, brass and other copper alloys.

When the member is made by pressing from sheet metal, or by casting methods other than die casting it may be preferable to carry out the method by cutting a completely preformed member along or around the aforesaid dividing zone so as to remove enough metal to create the required gap.

Alternatively, with the aid of a sufficiently accurate method, such as die-casting, the components of the member may be separately preformed to eliminate the step of cutting to provide the division.

Suitable plastics materials, for use with cast aluminum or magnesium alloy members, as commonly employed for example for engine covers, are nitrile rubbers and neoprene rubbers.

Figure 2:
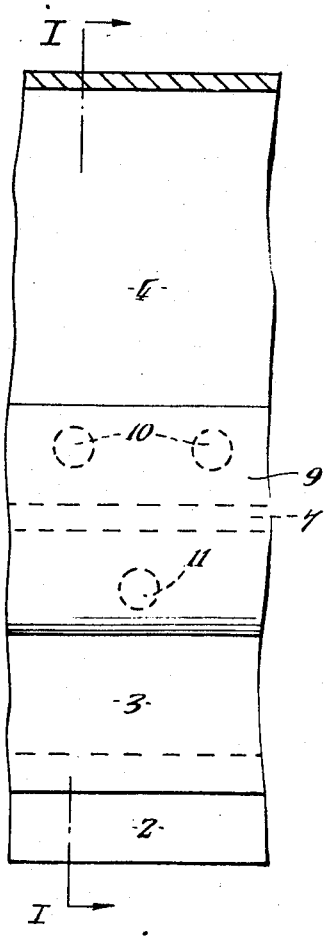

An embodiment of the invention will be briefly described, by way of example, with reference to the accompanying drawings, wherein:

FIG. 1 is a fragmentary section of a cast aluminum rocker box cover, on the line I—I of FIG. 2, which is a fragmentary elevation of the same in the direction of arrow II.

Referring to FIGS. 1 and 2 the rocker box 1 of which a portion is shown in the drawings is a deeply dished structure of substantially rectangular form having a surrounding rim 2 by which it may be clamped, with the interposition of a gasket, upon an internal combustion engine to cover the valve-operating rocker mechanism. The rocker box as shown is divided into two components 3 and 4, the component 3 being integral with the flange 2, and the component 4 comprising the top of the box and adjacent portions of the walls thereof. The side wall portions 5, 6 respectively of the components 3 and 4 are aligned as indicated in FIG. 1 and divided by a gap 7 which extends completely around the box and is parallel to the engaging surface 8 of the flange 2. The two components 3 and 4 are secured together by a band 9 of a resilient plastics material, preferably a nitrile or neoprene rubber, which is moulded or expanded on to marginal portions of the walls 4 and 5 adjacent the gap 7, while the two components are held in a suitable jig.

The jig referred to in the last paragraph provides mould surfaces which have an internal surface corresponding to the outer surface of the finished band 9. In the expansion process, the strips of rubber are held in position with the components on the jig and the assembly submitted to heating and/or steam treatment to cause the rubber to expand to the desired dimension to fill the joint.

In order more effectively to secure the components 3 and 4 together with the aid of the rubber band 9, the marginal portions thereof in the zone to be overlapped by the band 9 are drilled, punched or otherwise perforated at intervals, for example as shown at a pitch of about 1 inch in each component, with holes 10 and 11 which may be mutually staggered in the two portions. Thus the band 9 of rubber, which penetrates and fills the gap 7 as shown in FIG. 1, also penetrates and fills the holes 10 and 11 so as to supplement the bonding effect of the rubber adhering to the inner and outer surfaces of the walls 5 and 6 of the components.

In this embodiment, a flexible joint is made in a peripheral wall of a cover which is substantially perpendicular to the plane of the surface 8 at which the cover is secured to an engine. However, a like mode may be employed to form a cover which is substantially flat, or has a slight, substantially flat or convex or concave, dishing. The effect of the resilient support provided for the middle part of the cover, which may in many cases have a considerable area, is to reduce appreciably any drumming or resonance of said cover part due to vibratory noise of mechanism enclosed by the cover.

Alternatively such a joint may be used to give a shock or vibration damping effect in such members as aero-engine sumps, motor cycle carburetor suspensions and the like.

The use of such a joint gives a firm bond and yet can be used with metal of quite thin dimensions because of the overlap to the side of the gap.

What we claim and desire to secure by Letters Patent is:

1. A member adapted to form a machinery cover, or a part of such a cover divided at a zone spaced from means for its attachment to the machinery to provide two components which are separated by mutual linear movement to form an intervening narrow gap with marginal portions of the components at each side of the gap respectively, at least one of the components being provided with one or more keying apertures extending through the said marginal portion in a direction substantially at right angles to the direction of said linear movement, the components being connected together and insulated from mutual vibration transmission by a band of resilient natural or synthetic plastics material which fills the gap and overlaps and is bonded to the marginal portion of the components on either side of the gap and extends to fill the said keying aperture or apertures.

2. A member according to claim 1 wherein the plastics material is rubber which rubber has been expanded in size to fill the said gap.

3. A member according to claim 1 wherein the said components have a plurality of said keying apertures, the keying apertures on the respective components being in staggered relationship.

4. In machinery, a member forming a cover therefor, means for attachment of the member to the machinery, a part of the cover divided at a zone spaced from said attachment means and thereby providing two components having inside and outside marginal surfaces, the divided components being separated by a narrow gap, and each component being provided with at least one keying aperture extending therethrough, the components being connected together by a band of rubber which has been expanded in size to fill the said gap and keying apertures and which band overlaps and is bonded to the marginal surfaces of the inside and outside of the components on either side of the gap.

* * * * *